(12) United States Patent
Biskeborn

(10) Patent No.: US 6,892,445 B2
(45) Date of Patent: May 17, 2005

(54) TAPE HEAD MODULE ASSEMBLY SYSTEM

(75) Inventor: Robert Glenn Biskeborn, Hollister, CA (US)

(73) Assignee: International Business Machines Corporation, Armonk, NY (US)

( * ) Notice: Subject to any disclaimer, the term of this patent is extended or adjusted under 35 U.S.C. 154(b) by 219 days.

(21) Appl. No.: 09/938,187

(22) Filed: Aug. 23, 2001

(65) Prior Publication Data

US 2003/0039077 A1 Feb. 27, 2003

(51) Int. Cl.$^7$ ............................................. B23P 19/00
(52) U.S. Cl. ............................ 29/729; 29/737; 29/744; 29/33 R; 29/467; 29/468
(58) Field of Search .................... 29/737, 744, 729, 29/834, 33 R, 467, 468, 603.01, 603.21, 603.17, 603.05–603.07; 360/126, 127, 131

(56) References Cited

U.S. PATENT DOCUMENTS

| | | | |
|---|---|---|---|
| 4,458,398 A | * | 7/1984 | Goldstein et al. ........... 29/33 R |
| 4,823,221 A | | 4/1989 | McConica et al. |
| 4,854,036 A | * | 8/1989 | DiGregorio .................. 29/744 |
| 5,033,184 A | | 7/1991 | Tandai et al. |
| 5,124,866 A | | 6/1992 | Rothermel |
| 5,237,476 A | | 8/1993 | Bischoff et al. |
| 5,239,434 A | | 8/1993 | Naito et al. |
| 5,594,608 A | | 1/1997 | Dee |
| 5,905,613 A | | 5/1999 | Biskeborn et al. |
| 5,909,343 A | | 6/1999 | Kanno et al. |
| 5,943,196 A | | 8/1999 | Chaug |
| 6,038,108 A | | 3/2000 | Dee et al. |
| 6,040,964 A | | 3/2000 | Saliba |
| 6,374,479 B1 | * | 4/2002 | Sasaki et al. ............ 29/603.16 |
| 2003/0039077 A1 | * | 2/2003 | Biskeborn .................... 360/291 |

* cited by examiner

*Primary Examiner*—Minh Trinh
(74) *Attorney, Agent, or Firm*—Crawford Maunu PLLC

(57) ABSTRACT

A tape head module assembly system is disclosed. A first and second module holder are placed in an initial alignment with module holder ends facing each other, the module ends each holding a tape head module. A tape wrap angle between the first and second module is set by first performing a fringe alignment and then lifting a rear end of the first and second module holder a prescribed amount. A horizontal adjuster produces a rotation for the first module holder so that gaps between the first and second modules are parallel. An alignment along a longitudinal axis for the second module holder is selected and the second module is translated laterally until the second tape head module held by the second module holder is aligned with the first tape head module held by the first module holder to provide reader-opposite-writer track-to-track registration. Then, the first and second tape head modules are joined together using a joining agent in the gap between the first and second tape head modules.

18 Claims, 12 Drawing Sheets

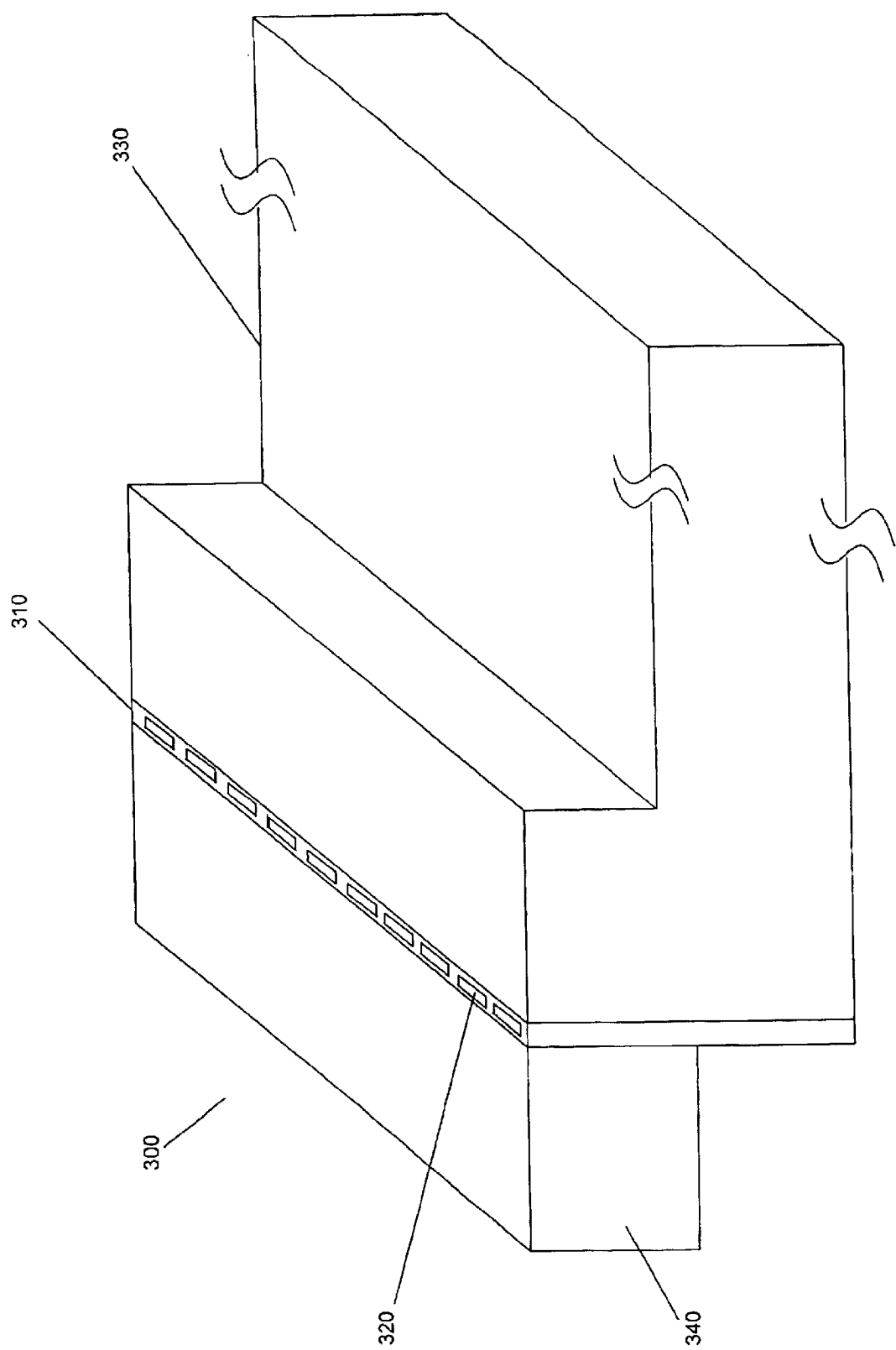

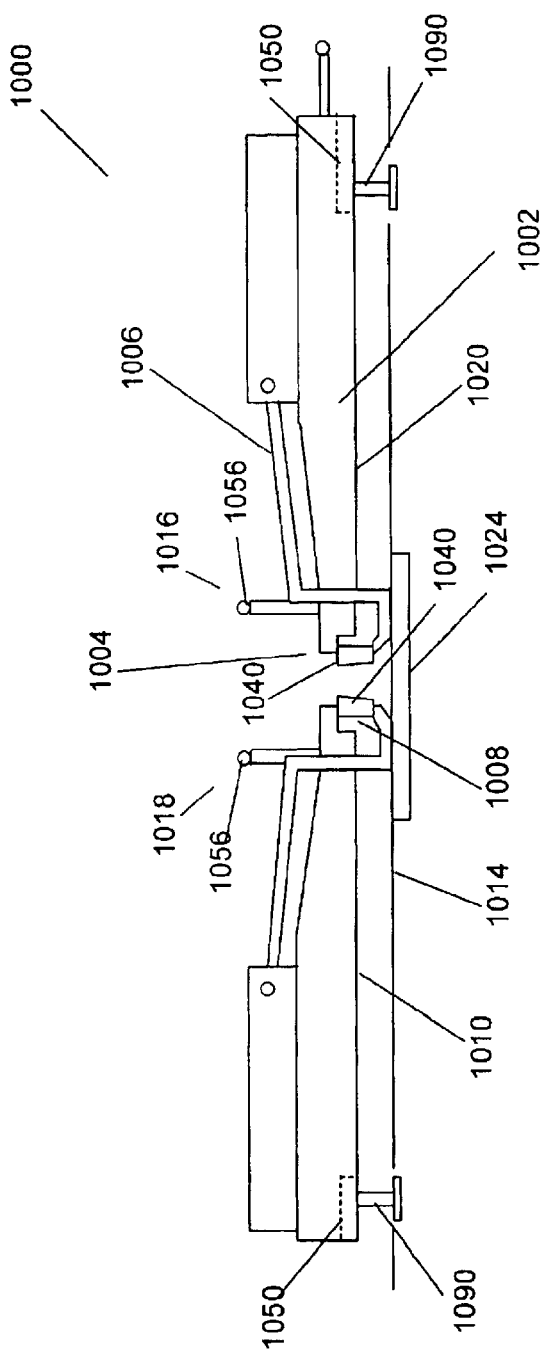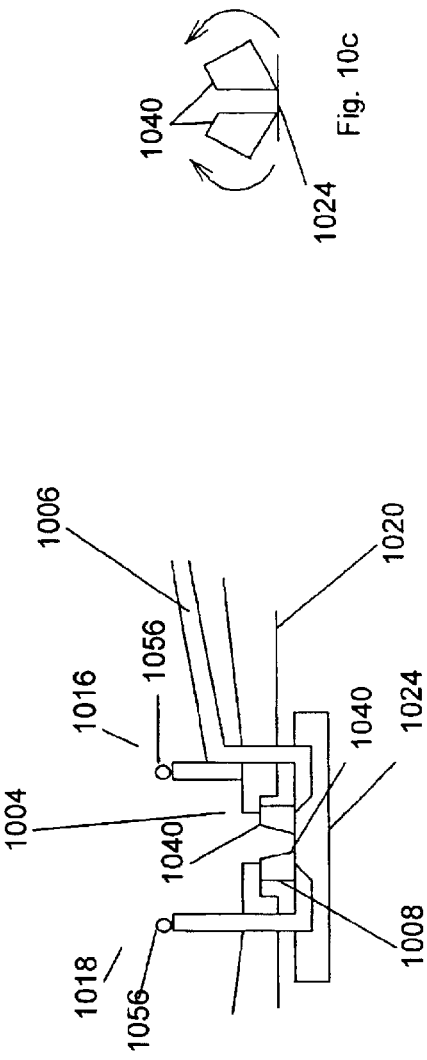

TAPE HEAD MODULE ASSEMBLY SYSTEM

BACKGROUND OF THE INVENTION

1. Field of the Invention

This invention relates in general to tape head assemblies, and more particularly to a tape head module assembly system and method.

2. Description of Related Art

In high-speed data processing systems, magnetic recording has been employed for large storage capacity requirements. In magnetic storage systems, data is read from and written onto magnetic recording media utilizing magnetic transducers commonly referred to as magnetic heads. Data is written on the magnetic material by moving a magnetic recording head to a position over the magnetic material where the data is to be stored. The magnetic recording head then generates a magnetic field, which encodes the data into the magnetic material. Data is read from the media by similarly positioning the magnetic head and then sensing the magnetic field of the magnetic material. Read and write operations are independently synchronized with the movement of the media to insure that the data can be read from and written to the desired location on the magnetic material.

An important and continuing goal in the data storage industry is that of increasing the density of data stored on a medium. For tape storage systems, that goal has lead to increasing the track density on recording tape, and decreasing the thickness of the magnetic tape medium. However, the development of small footprint, higher performance tape drive systems has created various problems in the design of a tape head assembly for use in such systems.

In a tape drive system, magnetic tape is moved over the tape surface of the tape head at high speed. This movement generally entrains a film of air between the head and tape. Usually the tape head is designed to minimize the spacing between the head and the tape.

During operation, an actuator mechanism moves the head and magnetic transducers to a desired position on the surface of the moving medium where the head electromagnetically reads or writes data. Typically, the magnetic transducers are integrally fabricated in a carrier or support referred to as a "slider". The slider generally serves to mechanically support the head transducers and any electrical connections between the head and the remainder of the storage system.

In order to meet the demand for increasing areal densities in magnetic tape, many technological innovations are required. In order to improve data reliability, a read element corresponding to each write element reads the magnetic field from the tape immediately after it is written. This technique is known as read-while-write. To increase data transfer, the tape may be written as it travels in either direction across the tape head. This requires a read element downstream of each write resulting in a read-write-read head configuration.

A read-while-write head assembly comprises a write element in-line with a read element, the gap of the read element being accurately spaced to the gap of the write element, with the read element positioned downstream of the write element in the direction of tape motion. By continually reading "just recorded" data, the quality of the recorded data is immediately determinable at a time when the original data is still available in temporary storage in the recording system. The reproduced data is checked against the original data, and appropriate action, such as re-recording, may be taken in case of error.

Conventional thin film tape heads are fabricated using processes similar to those used in DASD heads. The process provides a plurality of layers deposited on the surface of a substrate to form the tape head transducers. For a tape head assembly, the read-after-write pair of magnetic recording heads include a first write element adjacent to a read element which is adjacent to a second write element, or a first read element adjacent to a write element which is adjacent to a second read element. Cables are then electrically attached to the heads to provide signal leads.

The next step is to join the cabled heads together to form the read-while-write unit. However, the two tape head sections may shift relative to one another during this joining process. Shifting of the two modules can affect tape wrap angle, track-to-track registration, and head-to-head parallelism. Previous two module tape head build methods do not have generally the required level of precision for modern high density recording applications. Flat heads require an internal tape wrap of approximately 1.8 degrees per side.

In addition, heads are now built with flat rather than curved tape bearing surfaces, as described in U.S. Pat. No. 5,905,613. These heads, when constructed for high density recording, have critical module-to-module alignment tolerances, and required a new design and a new assembly method for controlling their tolerances.

However, in general it is very difficult to hold, align and join the two modules to one another. Moreover, the alignment precision required makes the task even more difficult, if not impossible. This problem has been addressed for cylindrically contoured tape heads, but not for the flat contoured heads. Cylindrical contoured heads rely on datum unit alignment for setting the wrap angle, and this is generally not applicable to flat contoured heads. In addition spring loaded pin tooling used for cylindrically contoured heads does not meet the increasing demands of tighter track-to-track and other alignments required by narrow track width heads because such designs are plagued by stiction and erratic setup performance, and furthermore do not provide means for gripping the modules for accurate alignment independent of other tolerances.

It can be seen then that there is a need for a tape head module assembly system and method that systematizes the holding, aligning and joining of the two modules to one another, while providing micron level alignment tolerances.

SUMMARY OF THE INVENTION

To overcome the limitations in the prior art described above, and to overcome other limitations that will become apparent upon reading and understanding the present specification, the present invention discloses a tape head module assembly system and method.

The present invention solves the above-described problems by providing a system for tape head alignment that provides micron level alignment tolerances.

A tape head module assembly system in accordance with the principles of the present invention includes a support base, the support base having a surface area, a first module holder for holding a first tape head sub-assembly, a first position controller for adjusting and setting a position of the first module holder, a second module holder for holding a second tape head sub-assembly and a second position controller for adjusting and setting a position of the second module holder, wherein the first and second module holders are placed on the support base with a module end of each of the first and second module holders disposed on the surface area, the first and second position controllers adjusted to align the first and second tape head sub-assemblies and to allow the coupling of the first and second tape head sub-assemblies after alignment.

Other embodiments of a system in accordance with the principles of the invention may include alternative or optional additional aspects. One such aspect of the present invention is that the surface area comprises a hard transparent planar surface area.

Another aspect of the present invention is that the surface area is narrower than a tape head sub-assembly.

Another aspect of the present invention is that the first position controller comprises an elevation control for adjusting a height of a rear portion of the first module holder.

Another aspect of the present invention is that the first module holder comprises a translation structure for allowing a rear portion of the first module holder to be rotated.

Another aspect of the present invention is that the first module holder comprises a pivot structure disposed at the module end, the pivot structure enabling the first module holder to pivot about an axis at the pivot structure.

Another aspect of the present invention is that the first position controller comprises a first module holder anchor, the first module holder anchor comprising a moveable plate and a pivot structure engaging arrangement, the first module holder anchor engaging the pivot structure of the first module holder to hold the first module holder so that the first module holder pivots about the axis at the pivot structure.

Another aspect of the present invention is that the first position controller further comprises a lateral adjuster for causing a rear portion of the first module holder to move in a lateral motion to cause the first module holder to pivot about an axis approximate the module end of the first module holder.

Another aspect of the present invention is that the second position controller comprises an elevation control for adjusting a height of a rear portion of the second module holder.

Another aspect of the present invention is that the second module holder comprises a linear translation structure for allowing the second module holder to be translated linearly toward or away from the first module holder.

Another aspect of the present invention is that the second module holder comprises a securement structure disposed at the module end, the securement structure enabling the second module holder to move linearly toward or away from the first module holder.

Another aspect of the present invention is that the second position controller comprises a second module holder anchor, the second module holder anchor comprising a moveable plate and an engaging arrangement, the second module holder anchor engaging the securement structure of the second module holder to restrict movement of the second module holder so that the second module holder moves linearly toward or away from the first module holder.

Another aspect of the present invention is that the second position controller further comprises a lateral adjuster for causing the second module holder to move in a lateral motion to allow the second module holder to be aligned laterally with the first module holder.

Another aspect of the present invention is that each of the first and second module holders further include an arm having a grasping structure and an opposable piece forcibly engaging against the grasping structure to form a jaw for holding a tape head module therein, wherein the arm further comprises a slot disposed toward the rear of the arm and a first shaft disposed at a module end of the module holder.

Another aspect of the present invention is that the second module holder further comprises a second shaft extending away from the module end at the rear of the module holder, the second shaft providing a point for urging the second module holder toward the first module holder.

Another aspect of the present invention is that each of the first and second module holders further include a vacuum arrangement for holding a tape head module therein.

In another embodiment of the present invention, a tape head module assembly method is provided. The method includes placing a first and second module holder in an initial state with module holder ends facing each other, the module ends each holding a tape head module, setting a tape wrap angle between the first and second module by performing initial alignment, lifting a rear end of the first and second module holder a prescribed amount, selecting a horizontal alignment for the first module holder so that gaps between the first and second modules are parallel, selecting an alignment along a longitudinal axis for the second module holder, translating the second module laterally until the second tape head module held by the second module holder is aligned with the first tape head module held by the first module holder to provide reader-opposite-writer track-to-track registration and joining the first and second tape head modules together using a joining agent in the gap between the first and second tape head modules.

Another aspect of the tape head module assembly method of the present invention is that the placing a first and second module holder further includes placing the first and second module holder on a hard transparent surface and the performing initial alignment further includes establishing a startup point using optical fringe measurements between the modules and the hard transparent surface.

Another aspect of the tape head module assembly method of the present invention is that the surface area is narrower than a tape head sub-assembly.

In another embodiment of the present invention, a module holder is provided. The module holder includes an arm having a grasping structure and an opposable piece forcibly engaging against the grasping structure to form a jaw for holding a tape head module therein, wherein the arm further comprises a slot disposed toward the rear of the arm and a first shaft disposed at a module end of the module holder.

Another aspect of the module holder of the present invention is that the module holder further includes a second shaft extending away from the module end at the rear of the module holder, the second shaft providing a point for urging the second module holder toward the first module holder.

These and various other advantages and features of novelty which characterize the invention are pointed out with particularity in the claims annexed hereto and form a part hereof. However, for a better understanding of the invention, its advantages, and the objects obtained by its use, reference should be made to the drawings which form a further part hereof, and to accompanying descriptive matter, in which there are illustrated and described specific examples of an apparatus in accordance with the invention.

BRIEF DESCRIPTION OF THE DRAWINGS

Referring now to the drawings in which like reference numbers represent corresponding parts throughout:

FIG. 3 illustrates a read-while-write head according to the present invention;

FIG. 10a illustrates a side view of the two module holders according to the present invention;

FIG. 10b shows the jaws of the two module holders straddling the clear surface according to the present invention;

FIG. 10c shows the modules being aligned as a result of the lifting of the rear ends of the module holders according to the present invention;

DETAILED DESCRIPTION OF THE INVENTION

In the following description of the exemplary embodiment, reference is made to the accompanying drawings that form a part hereof, and in which is shown by way of illustration the specific embodiment in which the invention may be practiced. It is to be understood that other embodiments may be utilized as structural changes may be made without departing from the scope of the present invention.

The present invention provides a tape head module assembly system and method that systematizes tape head alignment and provides micron level alignment tolerances.

Figure 1:
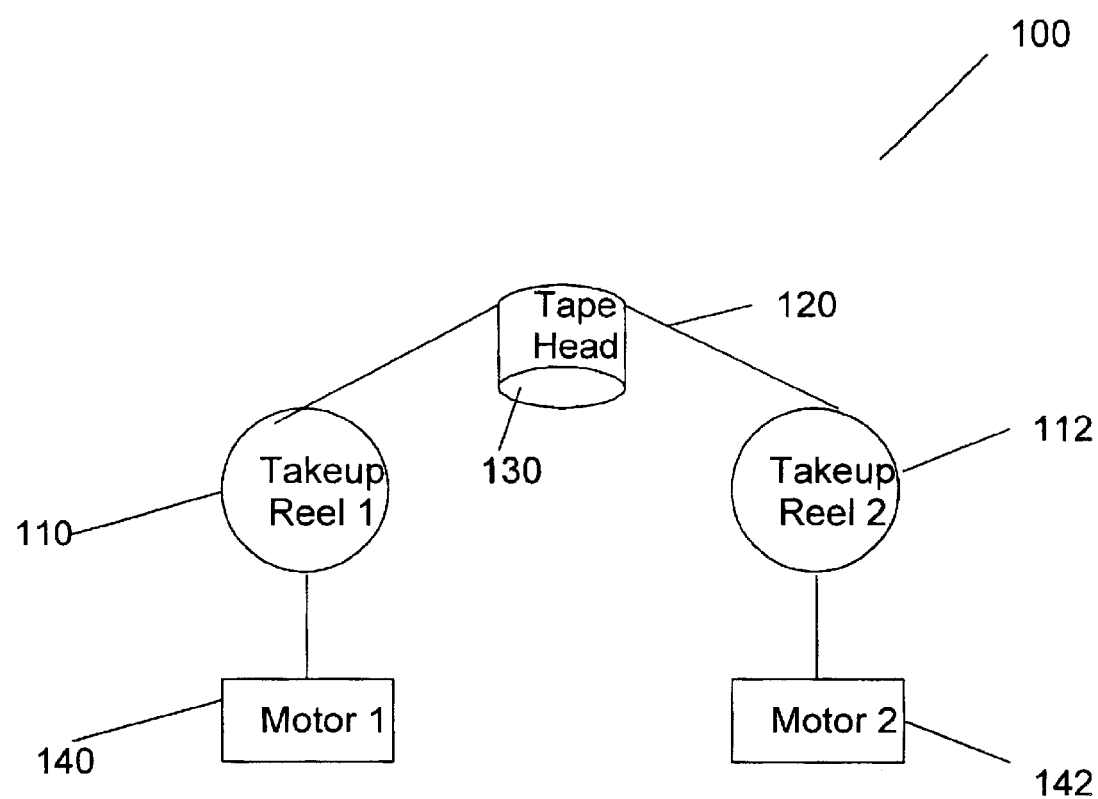
FIG. 1 illustrates a tape system 100 according to the present invention.

FIG. 1 illustrates a tape system 100 according to the present invention. The tape system 100 includes a first supply and a second take-up reel 110, 112. Magnetic recording tape 120 is spooled on the first and second take-up reels 110, 112. The magnetic recording tape 120 is routed over a tape read/write head 130 for reading and writing data on the magnetic recording tape 120. Take-up reel motors 140, 142 control the movement of the magnetic recording tape 120 over the tape read/write head 130.

Figure 2A:
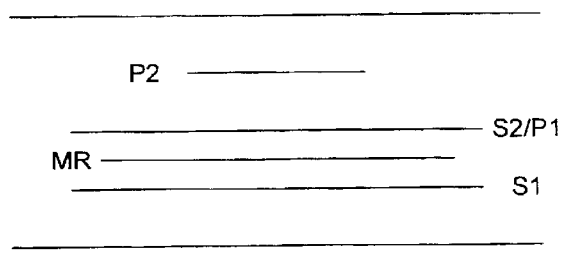
FIG. 2A is a simple diagram of a merged head.

Many modern tape recording systems require operation where writing and reading of the data occurs for either direction of tape travel. The streaming tape system where the recording is laid down on the tape for alternate directions of tape travel is an example of such a bi-directional recording system. Piggyback magnetoresistive read and write element structures have been used in DASD (direct access storage devices; i.e., hard disk) recording heads. FIG. 2A is a simple diagram of a merged head. In FIG. 2A, the MR element is shown disposed between the first shield and the second shield. The second shield also acts as a first pole for an inductive write head that is completed with the second pole. Merged or piggyback read and write elements can be used in a read-after-write application such as described herein for magnetic tape application, but these must be used in pairs, like side-by-side readers and writers because of the problems feedthrough presents.

Figure 2B:
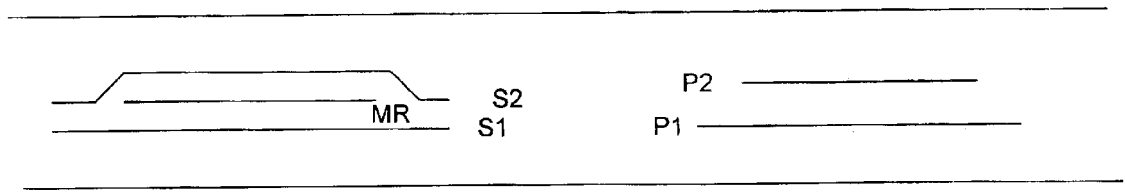
FIG. 2B is a simple diagram of a side-by-side head.

Incorporation of read-while-writing capability for bi-directional operation has traditionally necessitated a head assembly consisting either of: a first read element adjacent to a write element which is adjacent to a second read element or a side-by-side head which is shown in FIG. 2B. FIG. 2B is a simple diagram of a side-by-side head. In FIG. 2B, the MR read head is shown to the left and includes the MR element and a first and second magnetic shield. The write head is formed beside the read head; here to the right of the MR read head. The write head is formed by the first and second poles.

A read-while-write head assembly comprises a write element in-line with a read element, the gap of the read element being closely spaced to the gap of the write element, with the read element positioned downstream of the write element in the direction of tape motion. FIG. 3 illustrates a read-while-write head 300 according to the present invention. In FIG. 3, the layers 310 for the read-while-write transducer elements 320 are deposited on a substrate 330. The substrate 330 is separated from a closure 340 by the plurality of layers 310 forming the read-while-write transducers 320.

Figure 4:
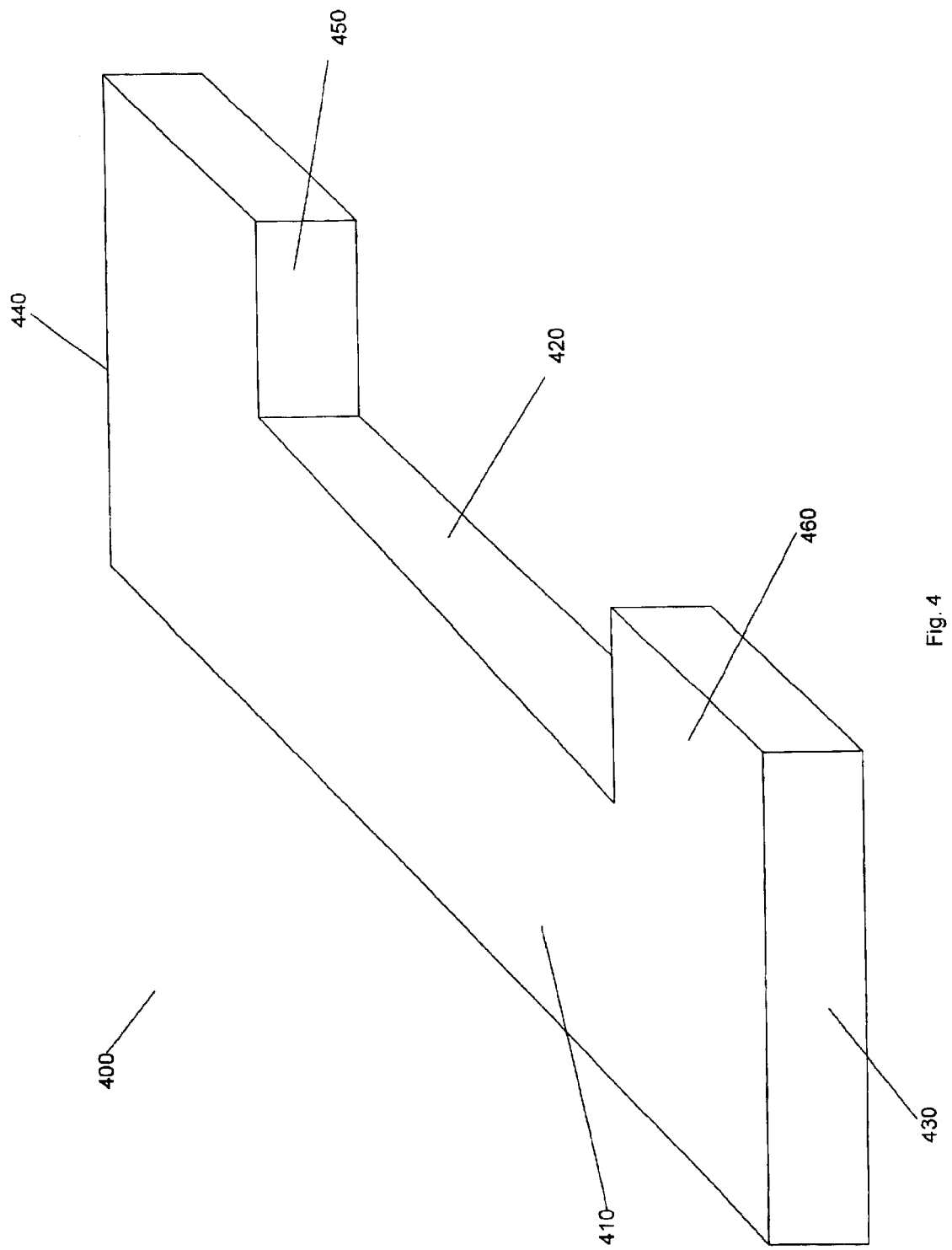
FIG. 4 illustrates a U-beam support beam according to the present invention.

FIG. 4 illustrates a U-shaped support beam 400 according to the present invention. The U-shaped support beam 400 comprises a flat beam 410 having a recess 420 disposed between the ends 430, 440. The recess 420 forms two U-beam projections or legs 450, 460 at either side of the U-beam. The ends of the legs 420 may also be referred to herein as engagement areas because they provide surfaces that may be joined with like engagement surfaces on a coordinated U-beam. The shape of the beam, however, is not limited to a U-shape, but must provide engagement surfaces and a recessed portion 420. The recessed portion 420 allows cables to be electrically attached to the read-while-write heads and bonded to the U-beam 400 for strain relief in the region between the legs 450, 460. For example, the cables may be coupled to the tape heads by ultrasonically bonding flying leads to the support beams. Thus, the recess portion 420 provides a receptacle for framing a cable that is attached to a tape head disposed on the U-beam 400.

Figure 5:
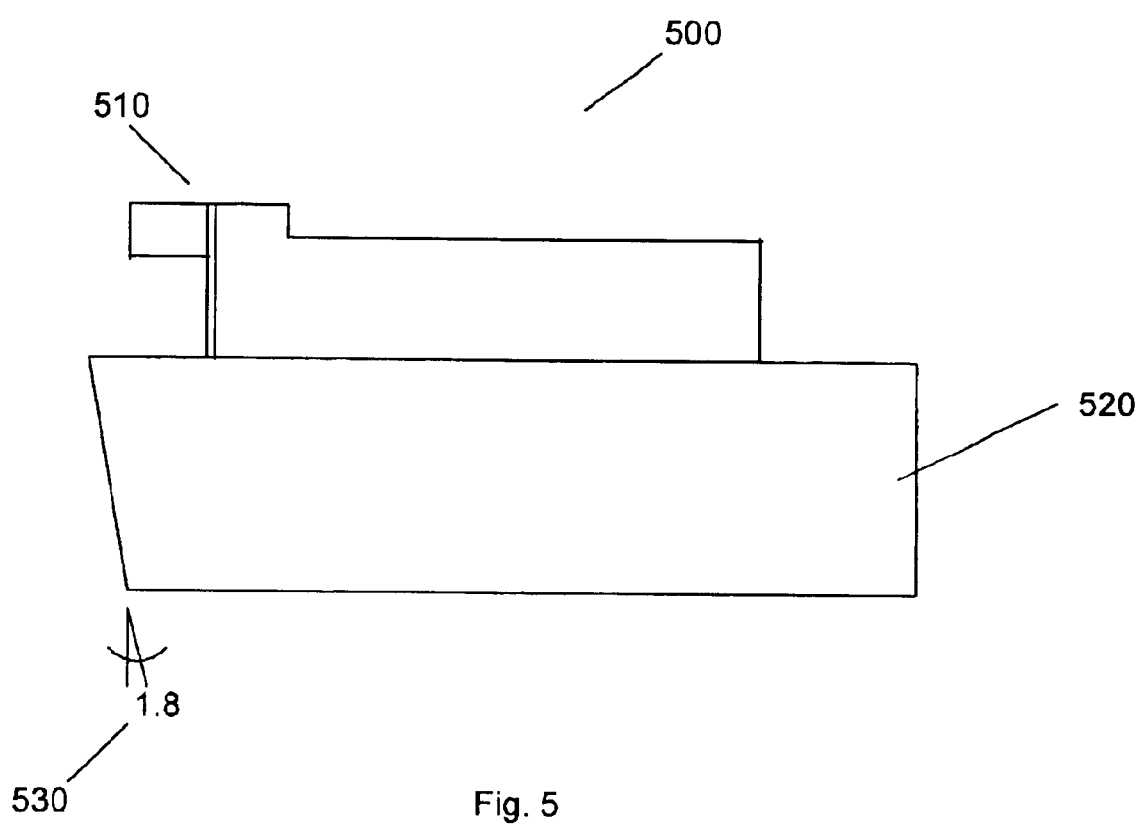
FIG. 5 illustrates a tape head sub-assembly according to the present invention.

FIG. 5 illustrates a tape head sub-assembly 500 according to the present invention. The tape head sub-assembly 500 includes a transducer structure or thin film tape head 510, for example comprising a read-after-write pair of magnetic heads or transducers, attached to a rigid, precision U-shaped support beam 520. Wafer processed thin film tape heads 510 are fabricated and bonded to the top surfaces of the U-beam 520 prior to joining the two U-beams together (as will be described below). According to the present invention, the head joining process can be automated and results in components that are very flat. Furthermore, the flatness can be controlled by surface stress conditioning of both the beams 520 and the tape heads 510. Tape head sub-assembly 500 constructed according to the present invention is suitable for very high-density tape recording, such as flat head recording technology. Previous head build methods do not generally have the required level of precision for flat heads. Flat heads require an internal tape wrap of approximately 1.8 degrees per side. Accordingly, the 1.8 degree angle 530 is built into the U-beam 520 to ensure a uniform joining gap.

Figure 6A:
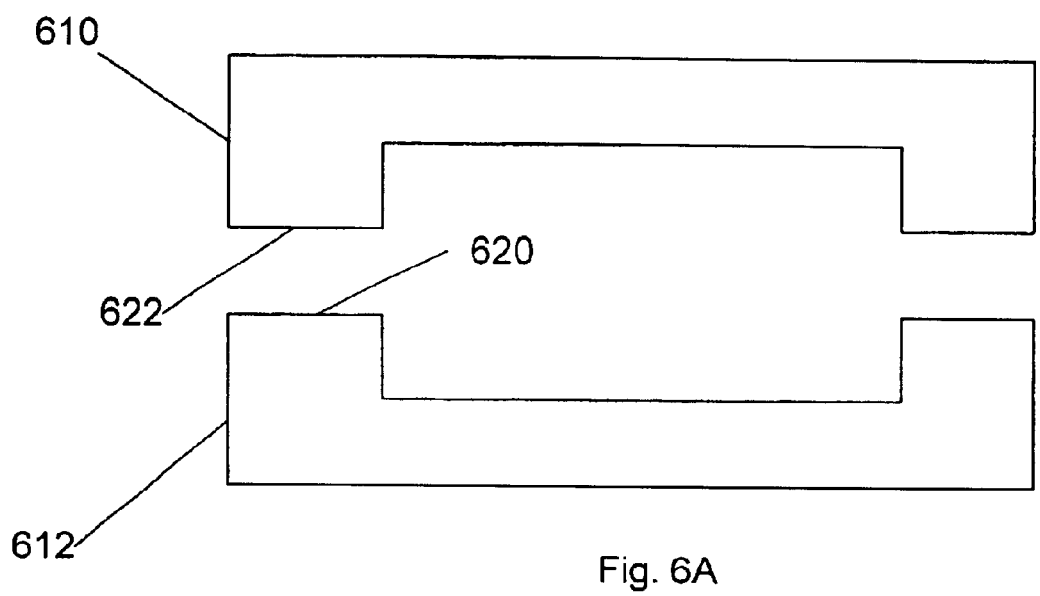
FIG. 6A shows two U-beams prior to application of a joining agent.
Figure 6B:
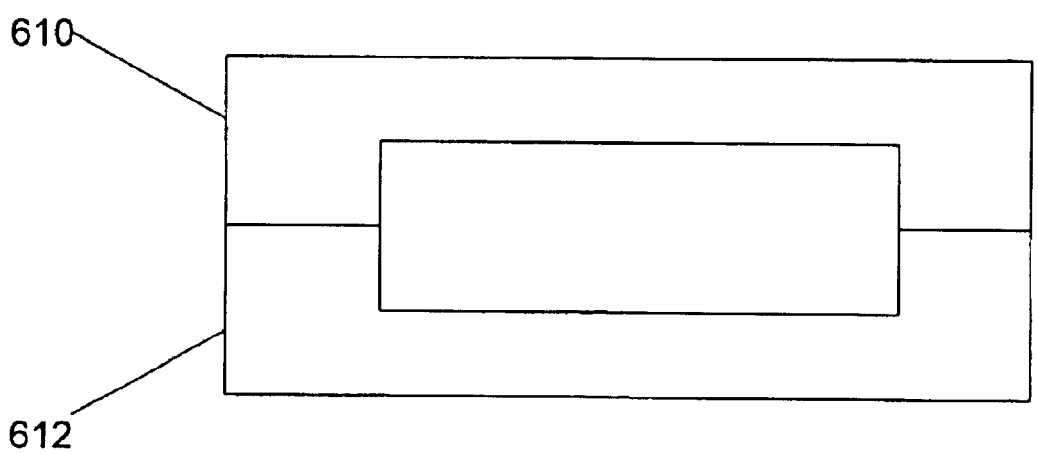
FIG. 6B shows the joining of the two U-beams.

FIG. 6a shows two U-beams 610, 612 prior to application of a joining agent. The two U-beams 610, 612 are typically joined together using a joining agent. A joining agent is applied to the legs 620, 622. The two U-beams 610, 612 are then joined as shown in FIG. 6b. This procedure solves the problem of the individual heads shifting relative to one another as the joining agent cures by placing the critical dimensions of the critical path. Moreover, this method results in very precise tape wrap angle setting, track-to-track registration, and head-to-head parallelism.

Figure 7:
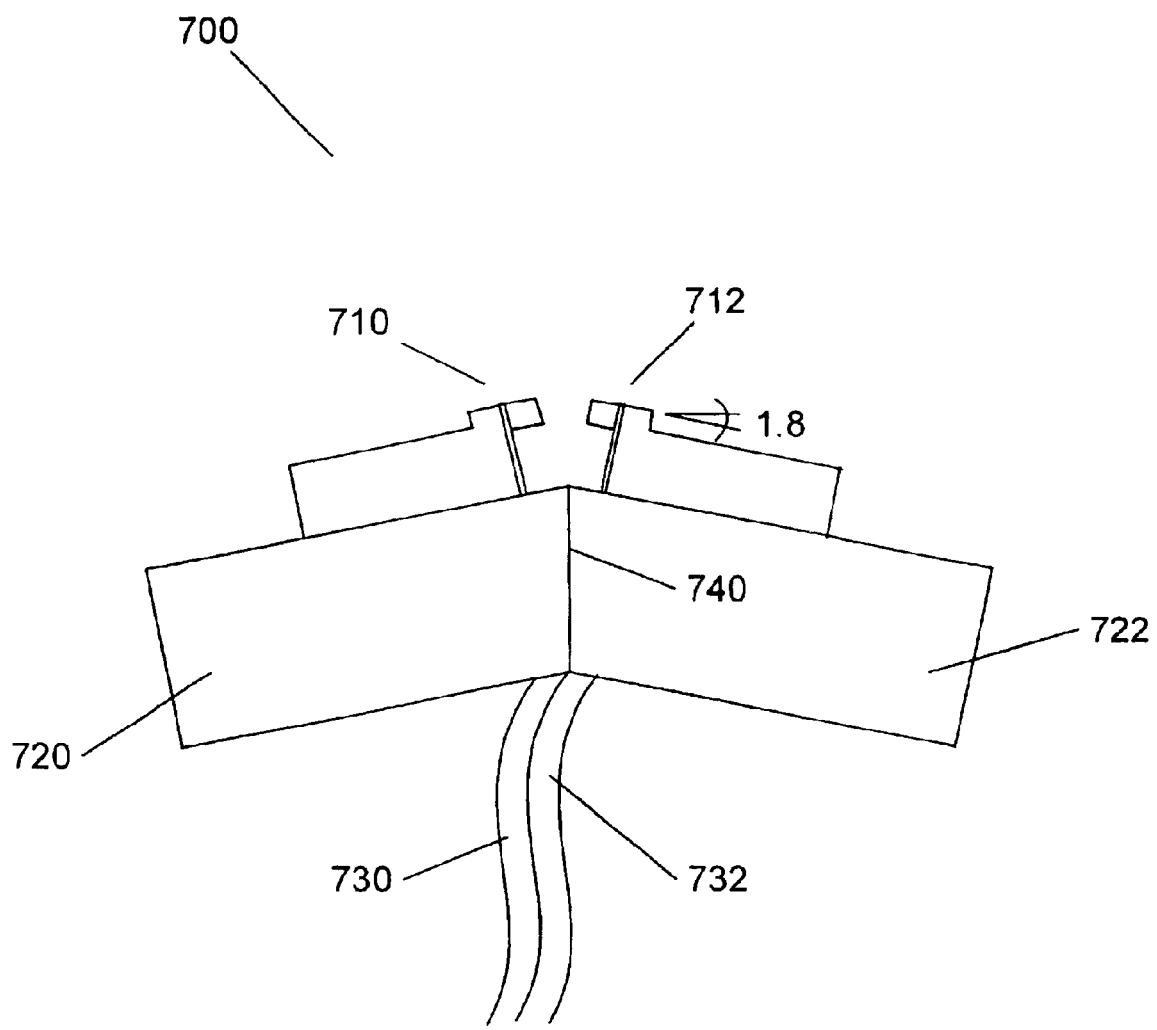
FIG. 7 illustrates a side view of the tape head assembly according to the present invention.

FIG. 7 illustrates a side view of the tape head assembly 700 according to the present invention. In FIG. 7, the tape head assembly 700 includes a read-after-write pair of magnetic recording heads 710, 712 attached to two rigid, precision U-shaped support beams 720, 722. Wafer processed thin film tape heads 710, 712 are fabricated and bonded to the top surfaces of the U-beams 720, 722. Cables 730, 732 are electrically attached to the heads 710, 712 and bonded to the U-beams 720, 722 for strain relief in the region between the legs. The cabled beams 720, 722 are then positioned with the end surfaces 740 of the legs of one in close proximity to those of its companion. Critical height, wrap angle and track-to-track alignments are performed. Finally, the beams are joined together using a joining agent in the narrow gap between the ends of the legs. The required tolerances for tape wrap angle setting, track-to-track registration, and head-to-head parallelism are achieved by minimizing relative motion of the two halves during joining agent setting, because lateral forces exerted by the joining agent are generally small and the horizontal component tends to cancel, as there are two legs.

Figure 8:
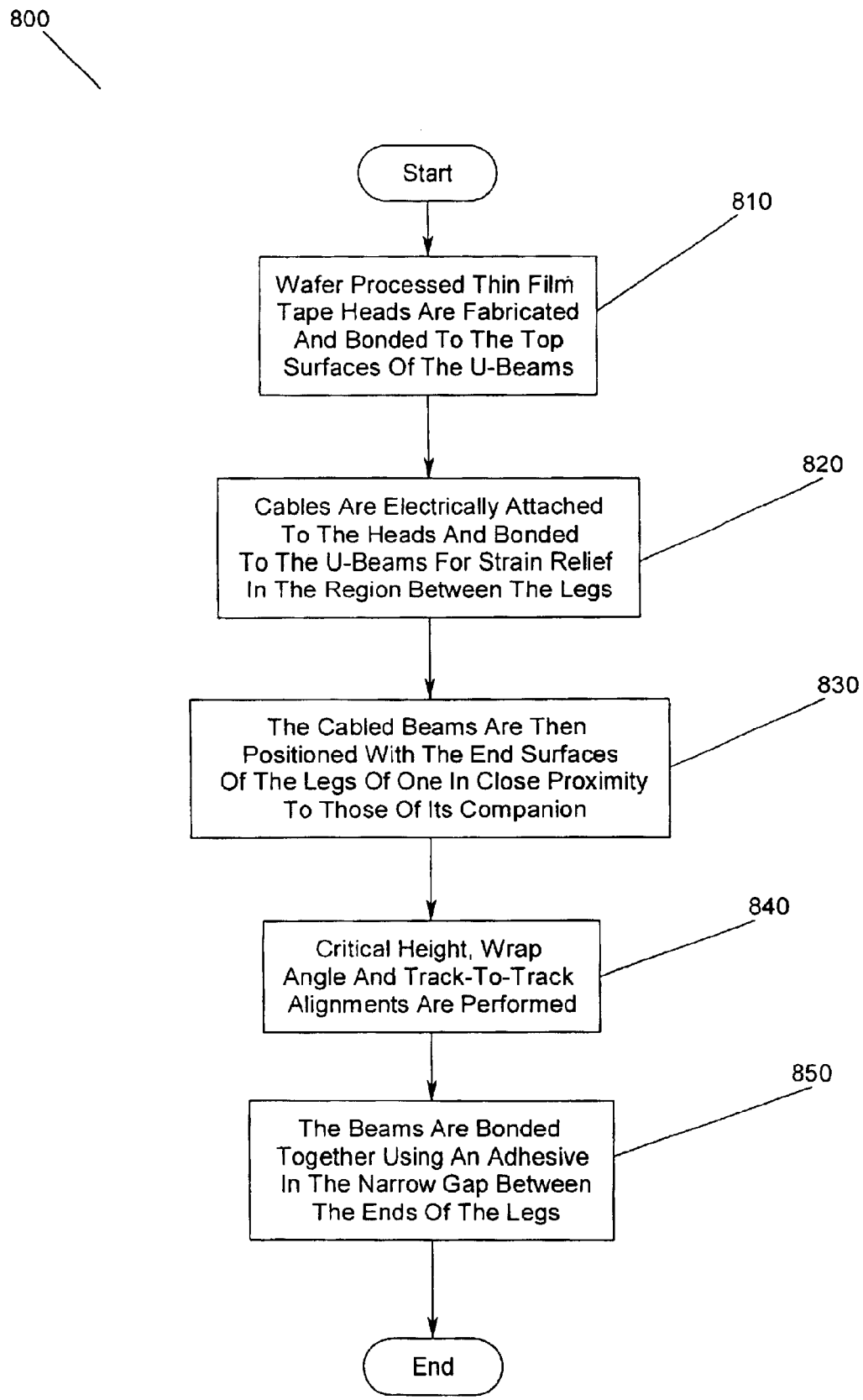
FIG. 8 is a flow chart of the method for providing tape head assemblies for very high density recording according to the present invention.

FIG. 8 is a flow chart 800 of the method for providing tape head assemblies that prevent relative motion of this alignment during curing of the joining agent according to the present invention. Wafer processed thin film tape heads are fabricated and bonded to the top surfaces of the U-beams 810. Cables are electrically attached to the heads and bonded to the U-beams for strain relief in the region between the legs 820. The cabled beams are then positioned with the end surfaces of the legs of one in close proximity to those of its companion 830. Critical height, wrap angle and track-to-track alignments are performed 840. The beams may then be joined together using a joining agent in the narrow gap between the ends of the legs 850.

However, as mentioned above, in general it is very difficult to hold, align and join the two modules to one another. Moreover, the alignment precision required makes the task even more difficult, if not impossible. Accordingly, the present invention provides a tape head module assembly system and method that provides micron level alignment tolerances.

Figure 9:
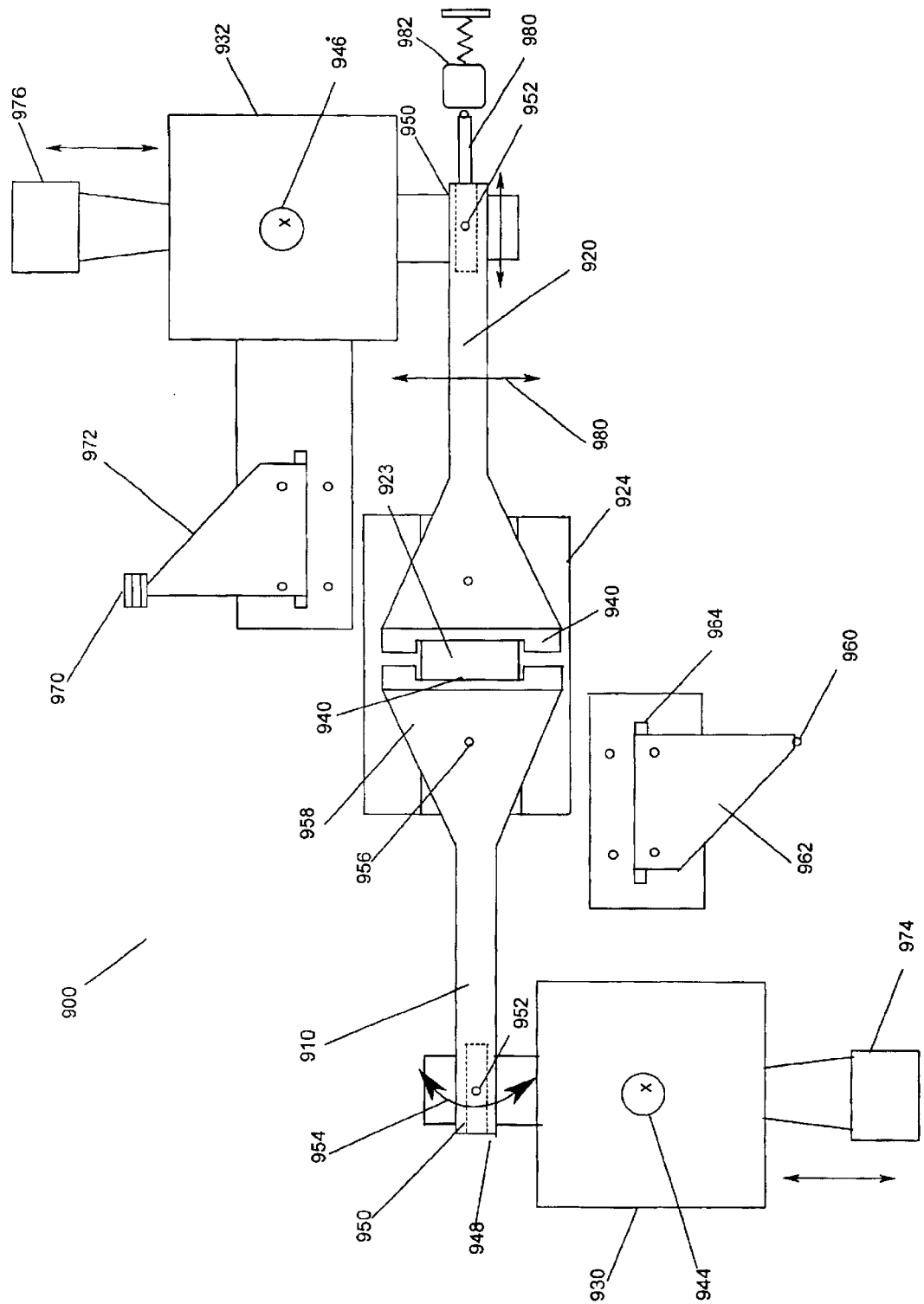
FIG. 9 illustrates the tape head module assembly system according to the present invention.

FIG. 9 illustrates the tape head module assembly system according to the present invention. FIG. 9 illustrates two module holders 910, 920 disposed over an opening 923 with modules 940 disposed on a hard, flat surface 924. Preferably the hard flat surface 924 is transparent, e.g., glass or sapphire. Motion stages 930, 932 provide micron level controlled motion to the module holders 910, 920 relative to one another. For example, four or more stages may be provided for controlled motion of the modules relative to one another.

The module holders 910, 920 are preferably mechanical devices. However, the module holders 910, 920 may alternatively be vacuum devices or devices that use a temporary adhesive. The flat air-bearing, tape contact surfaces of each module 940 rest on the glass 924, typically with the force of gravity acting down on the modules and the holders, which may be weighted accordingly.

The tape wrap angle between the two modules is then set by first establishing planarity with the transparent surface using optical fringes, then lifting the opposite end of each module holder a prescribed amount. This is performed by rotating height adjusters 944, 946 to change the height of the rear end 948 of the module holders 910, 920. For example, the rear 948 of each module holder 910, 920 may be equipped with a smooth, surface-hardened groove 950. A sapphire or other hard, low friction ball 952 may engage the slot. Actuator 944, 946 may be used to lift the ball 952. As the ball 952 lifts, the ball 952 is free to slip in the groove 950 to provide the proper alignment. The remaining module holder motions are constrained.

A first module 910 can only rotate 954 in the horizontal plane by adjusting control 974. This constraint is achieved by providing a sapphire ball 956 on the module end 958 of the holder 910, just above the module 940. This ball 956 engages a fixed, smooth, hardened socket 960. The socket 960 is mounted on a plate 962 that is free to pivot 964 about a fixed axis that is outboard of the longitudinal axis of the module holder 910, and so provides an anchor 960, 962 that accommodates various ball heights. The second module holder 920 can only slide along the original longitudinal axis of the holder via the slot 950 in the rear of module holder 920 and slot 970 in plate 972, and can only be translated laterally 980 in a direction orthogonal to this by adjusting control 976. The second module holder 920 includes a sapphire ball 980 that is engaged by a spring-loaded stage 982 that urges the second module holder 920 toward the first module holder 910.

The next adjustment consists of aligning the module that can only rotate so that the gaps between the two modules are parallel to within 1–2 microns or better. The final adjustment consists of translating the second module 920 laterally 980 until fiducial marks that ensure reader-opposite-writer track-to-track registration are aligned to within 1–2 microns.

As described above, the modules 940 are thin film wafer 'chips' or "chiplets" fastened to previously disclosed U-beam carriers. After alignment, the U-beams of the modules 940 are joined together where they come into close proximity, as described above.

The present invention does not require sophisticated measurement systems for determining the module starting orientations relative to one another. In addition the modules can be preloaded into the mechanical carriers in an offline process for better throughput. Finally, with automation, this can be implemented into manufacturing with a minimum of operator training. The tape head module assembly system and method hold the parts securely in fixtures that are aligned, giving significantly greater tolerance control.

FIG. 10a illustrates a side view 1000 of the two module holders according to the present invention. Each of the module holders include an arm 1002 having a grasping structure 1004 and an opposable piece 1006, e.g. a spring loaded clasp, forming a jaw 1008. The module 1040 is secured between the grasping structure 1004 and an opposable piece 1006. The two module holders 1010, 1020 are positioned on the surface 1014 of the tape head module assembly system. The ends 1016, 1018 of the two module holders 1010, 1020 that hold the module 1040, including beams and tape heads, are placed at a clear surface 1024, e.g., glass or sapphire, with the ends 1016, 1018 of the two module holders 1010, 1020 that hold the modules 1040 facing each other.

FIG. 10b shows the jaws 1008 of the two module holders 1010, 1020 straddle the clear surface 1024 so that the flat tape head modules 1040 sit on the clear surface 1024 to allow optical fringe measurements between the modules 1040 and the hard transparent surface 1024 to be made.

An actuator may be used to lift the shaft 1090. As can be seen, the opposite end of each module holder 1010, 1020 may be lifted a prescribed amount because the rear of each module holder may be equipped with a smooth, surface-hardened groove 1050. A sapphire or other hard, low friction ball on shaft 1090 may engage the slot 1050. As the shaft 1090 lifts, the ball on the shaft 1090 is free to slip in the groove 1050 to provide the proper alignment of the modules 1040 as shown in FIG. 10c. In addition, a sapphire ball 1056 is disposed on the module end of the holder 1010, 1020 for rotational alignment of module 1010 and longitudinal alignment of module 1020 as described above.

Figure 11:
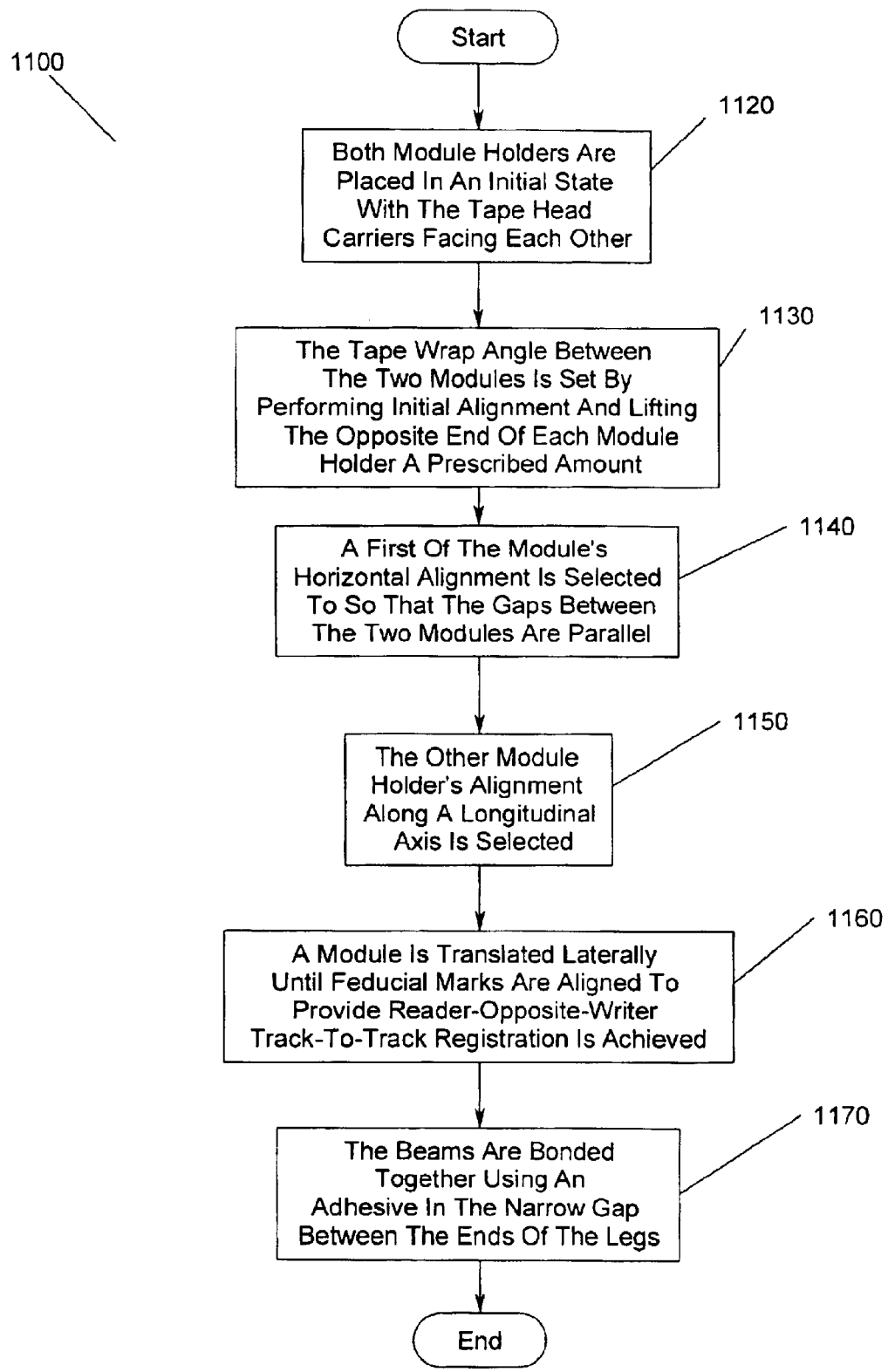
FIG. 11 is a flow chart of the tape head module assembly method according to the present invention.

FIG. 11 is a flow chart 1100 of the tape head module assembly method according to the present invention. Both module holders are placed in an initial state with the tape head carriers facing each other 1120. The tape wrap angle between the two modules is set by performing initial alignment and lifting the opposite end of each module holder a prescribed amount 1130. A first module's horizontal alignment is selected to so that the gaps between the two modules are parallel 1140. The other module holder's alignment along a longitudinal axis is selected 1150. A module is translated laterally until fiducial marks are aligned to provide reader-opposite-writer track-to-track registration 1160. The beams may then be joined together using an adhesive in the narrow gap between the ends of the legs 1170.

Figure 12:
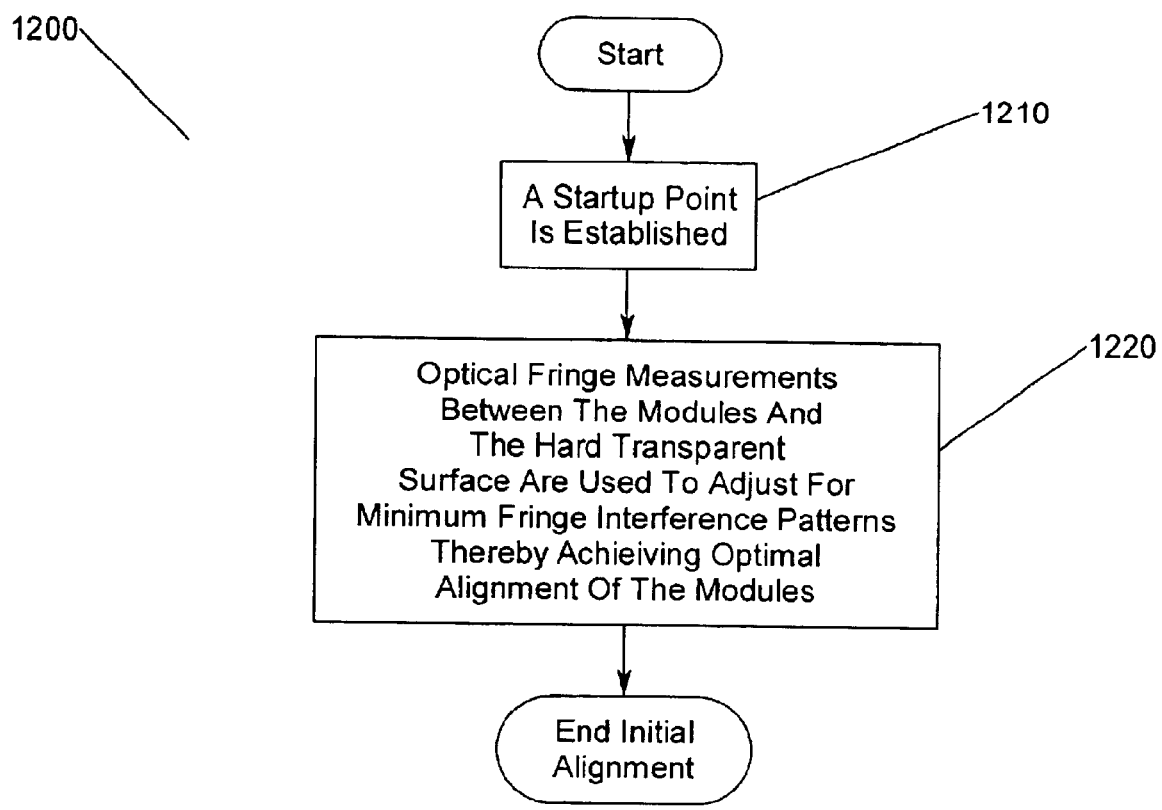
FIG. 12 is a flow chart of the initial alignment process.

FIG. 12 is a flow chart 1200 of the initial alignment process. First, a startup point is established 1210. Then, optical fringe measurements between the modules and the hard transparent surface are used to adjust for minimum fringe interference patterns thereby achieving optimal alignment of the modules 1220.

The present invention is compatible with both air bearing surface-up and air bearing surface-down assembly methods. Further, the present invention can be used for both full span tape heads and for partial span and so-called 'dimple' tape heads. For the latter, one or more recesses are required to accommodate the chiplet tape head.

The foregoing description of the exemplary embodiment of the invention has been presented for the purposes of illustration and description. It is not intended to be exhaustive or to limit the invention to the precise form disclosed. Many modifications and variations are possible in light of the above teaching. It is intended that the scope of the invention be limited not with this detailed description, but rather by the claims appended hereto.

What is claimed is:

1. A tape head module assembly system, comprising:
   a support base, the support base having a surface area;
   a first module holder for holding a first tape head sub-assembly;
   a first position controller for adjusting and setting a position of the first module holder;
   a second module holder for holding a second tape head sub-assembly; and
   a second position controller for adjusting and setting a position of the second module holder;
   wherein the first and second module holders are placed on the support base with a module end of each of the first and second module holders disposed on the surface area, the first and second position controllers adjusted to align the first and second tape head sub-assemblies and to allow the coupling of the first and second tape head sub-assemblies after alignment.

2. The tape head module assembly system of claim 1 wherein the surface area comprises a hard transparent planar surface area.

3. The tape head module assembly system of claim 1 wherein the surface area is narrower than a tape head sub-assembly.

4. The tape head module assembly system of claim 1 wherein the first position controller comprises an elevation control for adjusting a height of a rear portion of the first module holder.

5. The tape head module assembly system of claim 1 wherein the first module holder comprises a translation structure for allowing a rear portion of the first module holder to be rotated.

6. The tape head module assembly system of claim 1 wherein the first module holder comprises a pivot structure disposed at the module end, the pivot structure enabling the first module holder to pivot about an axis at the pivot structure.

7. The tape head module assembly system of claim 6 wherein the first position controller comprises a first module holder anchor, the first module holder anchor comprising a moveable plate and a pivot structure engaging arrangement, the first module holder anchor engaging the pivot structure of the first module holder to hold the first module holder so that the first module holder pivots about the axis at the pivot structure.

8. The tape head module assembly system of claim 7 wherein the first position controller further comprises a lateral adjuster for causing a rear portion of the first module holder to move in a lateral motion to cause the first module holder to pivot about an axis approximate the module end of the first module holder.

9. The tape head module assembly system of claim 1 wherein the first position controller further comprises a lateral adjuster for causing a rear portion of the first module holder to move in a lateral motion to cause the first module holder to pivot about an axis approximate the module end of the first module holder.

10. The tape head module assembly system of claim 1 wherein the second position controller comprises an elevation control for adjusting a height of a rear portion of the second module holder.

11. The tape head module assembly system of claim 1 wherein the second module holder comprises a linear translation structure for allowing the second module holder to be translated linearly toward or away from the first module holder.

12. The tape head module assembly system of claim 1 wherein the second module holder comprises a securement structure disposed at the module end, the securement structure enabling the second module holder to move linearly toward or away from the first module holder.

13. The tape head module assembly system of claim 12 wherein the second position controller comprises a second module holder anchor, the second module holder anchor comprising a moveable plate and an engaging arrangement, the second module holder anchor engaging the securement structure of the second module holder to restrict movement of the second module holder so that the second module holder moves linearly toward or away from the first module holder.

14. The tape head module assembly system of claim 13 wherein the second position controller further comprises a lateral adjuster for causing the second module holder to move in a lateral motion to allow the second module holder to be aligned laterally with the first module holder.

15. The tape head module assembly system of claim 1 wherein the second position controller further comprises a lateral adjuster for causing the second module holder to move in a lateral motion to allow the second module holder to be aligned laterally with the first module holder.

16. The tape head module assembly system of claim 1 wherein each of the first and second module holders further comprise:

an arm having a grasping structure; and an opposable piece forcibly engaging against the grasping structure to form a jaw for holding a tape head module therein, wherein the arm further comprises a slot disposed toward the rear of the arm and a first shaft disposed at a module end of the module holder.

17. The tape head module assembly system of claim 16 wherein the second module holder further comprises a second shaft extending away from the module end at the rear of the module holder, the second shaft providing a point for urging the second module holder toward the first module holder.

18. The tape head module assembly system of claim 1 wherein each of the first and second module holders further comprise a vacuum arrangement for holding a tape head module therein.

* * * * *